United States Patent
Hanrieder et al.

(10) Patent No.: US 8,961,129 B2
(45) Date of Patent: Feb. 24, 2015

(54) METHOD AND DEVICE FOR JOINING METAL ELEMENTS

(75) Inventors: Herbert Hanrieder, Hohenkammer (DE); Alexander Gindorf, Schwabhausen (DE)

(73) Assignee: MTU Aero Engines GmbH, Munich (DE)

( * ) Notice: Subject to any disclaimer, the term of this patent is extended or adjusted under 35 U.S.C. 154(b) by 1499 days.

(21) Appl. No.: 12/293,494

(22) PCT Filed: Mar. 14, 2007

(86) PCT No.: PCT/DE2007/000455
§ 371 (c)(1),
(2), (4) Date: Sep. 22, 2009

(87) PCT Pub. No.: WO2007/107143
PCT Pub. Date: Sep. 27, 2007

(65) Prior Publication Data
US 2010/0040455 A1    Feb. 18, 2010

(30) Foreign Application Priority Data
Mar. 20, 2006  (DE) .......................... 10 2006 012 674

(51) Int. Cl.
| | | |
|---|---|---|
| *F01D 5/14* | (2006.01) | |
| *B23K 13/01* | (2006.01) | |
| *B23K 37/04* | (2006.01) | |
| *F01D 5/00* | (2006.01) | |
| *F01D 5/30* | (2006.01) | |

(52) U.S. Cl.
CPC ............ *B23K 13/01* (2013.01); *B23K 37/0426* (2013.01); *F01D 5/005* (2013.01); *F01D 5/3061* (2013.01); *B23K 2201/001* (2013.01)
USPC .............................................. 416/1; 416/234

(58) Field of Classification Search
USPC ................. 416/226, 223 R, 234, 1; 29/889.7, 29/525.14; 219/617, 665
See application file for complete search history.

(56) References Cited

U.S. PATENT DOCUMENTS

| | | | | |
|---|---|---|---|---|
| 3,202,791 | A * | 8/1965 | Gillock et al. | 219/617 |
| 4,012,616 | A * | 3/1977 | Zelahy | 219/603 |
| 4,300,031 | A * | 11/1981 | Reboux et al. | 219/617 |
| 4,535,215 | A * | 8/1985 | Kliesch et al. | 219/61.5 |
| 4,873,751 | A * | 10/1989 | Walker et al. | 29/889.1 |
| 4,883,216 | A * | 11/1989 | Patsfall | 228/119 |
| 5,197,190 | A * | 3/1993 | Coolidge | 29/889.1 |
| 5,223,683 | A * | 6/1993 | Ishizaka | 219/608 |
| 5,366,580 | A * | 11/1994 | Czach | 156/359 |
| 5,376,766 | A * | 12/1994 | Higgins | 219/61.5 |
| 6,084,223 | A * | 7/2000 | Dietz et al. | 219/617 |
| 6,616,408 | B1 * | 9/2003 | Meier | 416/193 A |
| 2003/0223873 | A1 * | 12/2003 | Carrier | 416/213 R |

FOREIGN PATENT DOCUMENTS

JP    2000301355    10/2000

* cited by examiner

*Primary Examiner* — Edward Look
*Assistant Examiner* — Aaron R Eastman
(74) *Attorney, Agent, or Firm* — Greer, Burns & Crain, Ltd.

(57) ABSTRACT

A method for connecting metallic components, in particular components of a gas turbine, including: corresponding connecting surfaces of the components being connected by means of inductive HF pressure welding, and that during or after a sufficiently great heating of the connecting surfaces, the first component is moved by a definite path toward the second component, and is pressed against it and held there.

13 Claims, 1 Drawing Sheet

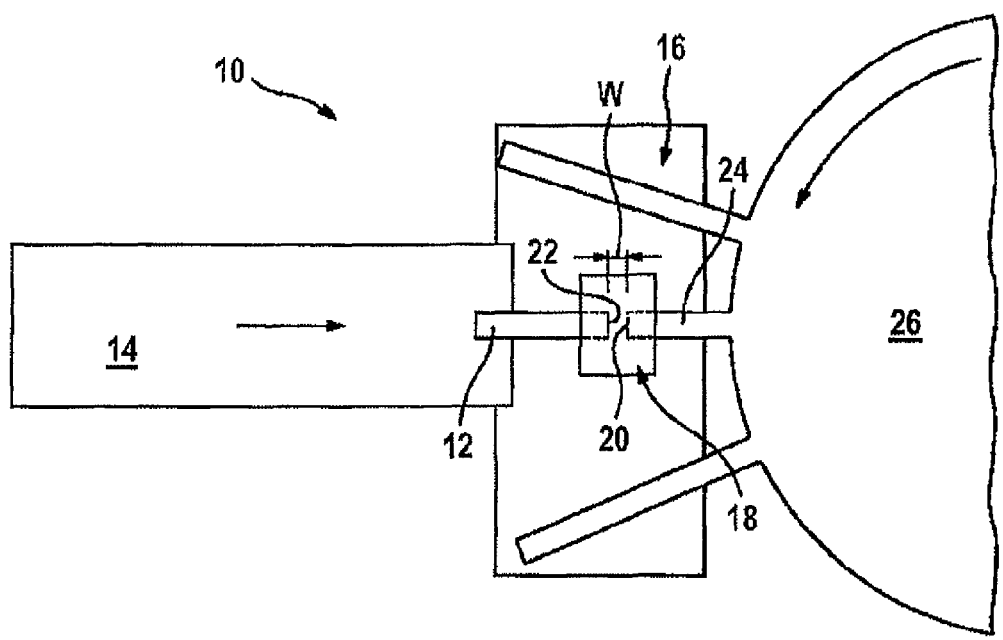

METHOD AND DEVICE FOR JOINING METAL ELEMENTS

FIELD OF THE INVENTION

The present invention relates to a method for joining or connecting metal elements, in particular components of a gas turbine, corresponding connecting surfaces of the components being connected by means of inductive HF pressure welding. In addition, the present invention relates to a device for connecting metallic components, in particular components of a gas turbine, corresponding connecting surfaces of the components being connected by means of inductive HF pressure welding.

BACKGROUND

From the prior art, various methods are known for connecting metallic components using inductive HF pressure welding. Thus, for example DE 198 58 702 A1 describes a method for connecting blade parts of a gas turbine, a blade vane segment and at least one additional blade part being provided. Here, corresponding connecting surfaces of these elements are positioned at a distance from one another so as to be essentially in alignment, and are subsequently welded to one another through the excitation of an inductor with a high-frequency current, and through being brought together so that their connecting surfaces contact one another. Here, the inductor is excited with a constant frequency, generally greater than 0.75 MHz. The frequency is also selected as a function of the geometry of the connecting surfaces. In inductive HF pressure welding, the simultaneous and homogenous heating of the two parts being welded is of decisive importance for the quality of the join point. Up to now, the joining process was carried out in a manner controlled by force. However, a disadvantage of this is that the resulting parts may have different lengths or dimensions, with the use of identical components.

The object of the present invention is therefore to provide a method of the type indicated above for connecting metallic components, in which on the one hand a reliable and long-lasting connection of components is ensured, while on the other hand identical lengths or dimensions of the resulting parts are ensured with the use of identical components. In addition, the object of the present invention is to provide a device of the type indicated above that ensures on the one hand a reliable and long-lasting connection of components and on the other hand ensures identical lengths or dimensions of the resulting parts with the use of identical components.

For the sake of clarity, it is here expressly noted that the designation "inductive HF pressure welding" does not limit the method or the device in the present case to a particular frequency range. Rather, frequencies are used ranging from the low kHz range up to the high MHz range, so that the new designation "inductive pressure welding" (IPS) could be introduced.

Advantageous constructions of the present invention are described in the respective subclaims.

A method according to the present invention for connecting metallic components, in particular components of a gas turbine, uses inductive HF pressure welding in order to connect corresponding connecting surfaces of the components. Here, advantageously during or after a sufficiently great heating of the connecting surfaces the first component is moved toward the second component by a defined path or distance W and is pressed against it and held there. In addition to a reliable and long-lasting connection of the components, this also ensures that the resulting parts will have identical lengths or dimensions given the use of identical components. In addition, this ensures a correct geometrical transition in the join zone of the two connecting surfaces. The correct geometrical transition also limits post-processing that may be required to this join area only. The method according to the present invention makes it possible for the first component to be capable of being moved in the direction of the second component, which itself is not capable of being moved in the direction of the first component. However, it is also possible for the first and the second component to be capable of being moved toward one another. The path W is standardly 0.5 mm to 10 mm.

In another advantageous realization of the method according to the present invention, in order to determine the quality of the resulting connection a measurement is carried out of the forces that occur during the pressing and holding process. This measurement is standardly carried out using at least one force sensor. In some exemplary embodiments, it has turned out that a force in the range of 200 N represents a reference value for an ideal joining or connection of the components. If it is necessary to apply forces greater than 200 N, the join zone has not been sufficiently melted, or is not sufficiently "doughy." Forces smaller than 200 N indicate that the join zone is too "doughy," or has melted too much.

In another advantageous realization of the method according to the present invention, before and during the movement of the first component toward the second component a monitoring is carried out of the position and orientation of the components. The monitoring of the position and orientation is standardly carried out using an optical measurement device. The monitoring of the position and orientation ensures an optimal movement and pressing together of the components that are to be connected. In addition, if necessary, changes of position and orientation can be carried out during the movement of the components.

In another advantageous realization of the method according to the present invention, the first component is a blade or a part of a blade of a rotor in a gas turbine, and the second component is a ring or a disk of the rotor or is a blade root situated on the periphery of the ring or of the disk. These parts, assembled from the named components and manufactured according to the method of the present invention, are what are known as BLINGs ("bladed rings") or BLISKs ("bladed disks") of gas turbine engines. In these parts, it is of significant importance that the ends of the blades always have the same distance relative to the disks or rings, or that the blades have a uniform length.

A device according to the present invention for connecting metallic components, in particular components of a gas turbine, uses an inductive HF pressure welding process in order to connect corresponding connecting surfaces of the components. Here, the device has at least one transport device for moving the first component toward the second component by a defined path W, or for moving the first and second component toward one another by the defined path W, as well as for pressing and holding the components. The path-controlled guidance of the components ensures on the one hand a reliable and long-lasting connection of the components. On the other hand, it is ensured that the resulting parts will have identical lengths or dimensions, given the use of identical components. In addition, the path-controlled guidance ensures a correct geometrical transition in the join zone. Through the at least one transport device, the first component, for example a blade of a turbine engine, is moved toward the second component, for example what is known as a BLISK rotor, by the defined path W, and is pressed against it and held there until the connection zone or join zone has cooled. Here, the transport device can be a component mount. The path W is standardly 0.5 mm to 10 mm.

In another advantageous construction of the device according to the present invention, this device has at least one force sensor for measuring the forces that occur during the pressing and holding process. In some exemplary embodiments, it has turned out that a force in the range of 200 N represents a control quantity for an ideal joining or connecting of the components. If forces greater than 200 N have to be applied, the join zone has not melted enough, or is not "doughy," or not doughy enough. In contrast, forces smaller than 200 N indicate that the join zone is too doughy or has melted too much.

In another advantageous construction of the device according to the present invention, the device has at least one position and orientation measurement device for monitoring the position and orientation of the components before and during the movement of the first component toward the second component. The monitoring of the position and orientation ensure an optimal movement and pressing against one another of the components that are to be connected. In addition, if necessary, changes in the position and orientation can be made during the movement of the components. The position and orientation measurement device is standardly an optical measurement device.

In another advantageous construction of the device according to the present invention, the first component is a blade of a rotor used in a gas turbine, or is a part thereof, and the second component is a ring or a disk of the rotor, or is a blade root situated on the periphery of the ring or of the disk. These parts, assembled from the named components, are what are known as BLINGs ("bladed rings") or BLISKs ("bladed disks") of gas turbine engines.

Additional advantages, features, and details of the present invention result from the following description of a graphically depicted exemplary embodiment.

BRIEF DESCRIPTION OF THE FIGURES

FIG. 1 is a schematic diagram of a device of an embodiment of the present invention.

DETAILED DESCRIPTION

Device 10 is made up of a generator 16 for producing the required welding energy and an inductor 18. Through excitation of inductor 18 with high-frequency current, connecting surfaces 20, 22 of components 12, 24 are heated. The heating is carried out up to a point that is at least close to the melting point of the materials of which components 12, 24 are manufactured. In the depicted exemplary embodiment, first component 12 is a part of a blade that together with second component 24, namely a blade root, is fashioned on the periphery of a disk 26. Disk 26 thus represents what is known as a BLISK rotor.

In addition, it will be seen that first component 12 is mounted in a component mount 14. Component mount 14 is used as a transport device for first component 12. In order to connect first component 12 to second component 24, component mount 14 is pushed in the direction of the arrow. This results in movement of first component 12 toward second component 24 by a defined path W.

The exemplary embodiment makes it clear that the method according to the present invention and device 10 according to the present invention are suitable both for the manufacture and also for the repair of components of a gas turbine.

The invention claimed is:

1. A method for connecting metallic components of a gas turbine, comprising:
   determining a defined path W for moving a first component towards a second component, said first and second components being independent components;
   determining a joining orientation and position for the first component relative to the second component;
   heating corresponding connecting surfaces of the first and second components while connecting the first and second components by means of inductive HF pressure welding, wherein the first component is moved along the defined path W toward the second component, and pressed against the second component and held there;
   monitoring relative orientations and positions of the first and second components as the first component moves toward the second component;
   changing the orientation and the position of the first component relative to the orientation and position of the second component as the first component moves toward the second component when the position and orientation of the first component is not in the joining orientation and position; and
   monitoring a pressing force between the first and second components and a position and an orientation of the first and second components relative to each other for evaluating the connection of the first component to the second component.

2. The method as recited in claim 1, wherein the first component is capable of being moved in the direction of the second component, which itself is not capable of being moved in the direction of the first component.

3. The method as recited in claim 1, wherein the first and second components are capable of being moved toward one another.

4. The method as recited in claim 1, wherein the path is 0.5 mm to 10 mm.

5. The method as recited in claim 1, wherein in order to determine the quality of the connection, a measurement is taken of forces that occur during the pressing and holding process.

6. The method as recited in claim 1, wherein the position and orientation monitoring is carried out by an optical measurement device.

7. The method as recited in claim 1, wherein the first component is a blade or a part of a blade of a rotor in a gas turbine, and the second component is a ring or a disk of the rotor, or is a blade root situated on the periphery of the ring or of the disk.

8. A component manufactured according to a method as recited in claim 1, wherein the component is a BUNG or a BLISK.

9. A device for connecting metallic components of a gas turbine, comprising:
   at least one transport device for moving a first mount including a first component by a defined path W toward a second mount including a second component, or for moving the first and second mounts by the defined path toward one another, and pressing and holding the first and second components together, said first and second components being independent components;
   a welding device configured to heat corresponding connecting surfaces of the first and second components while connecting the first and second components by inductive HF pressure welding;

a force sensor associated with the first and second components and configured for measuring a pressing force between the first and second components; and a position and orientation measurement device associated with the first and second components and configured for monitoring a position and an orientation of the first and second components before and during movement of one of the first mount or the second mount toward the other one of the first mount or the second mount, wherein the position and the orientation of the first component is adjusted relative to the second component during movement of the first mount or the second mount toward the other one of the first mount or the second mount when the position and the orientation measured by the position and orientation measurement device are not a pre-determined orientation and position for the first component relative to the second component.

10. The device as recited in claim 9, wherein the transport device is a component mount.

11. The device as recited in claim 9, wherein the path is 0.5 mm to 10 mm.

12. The device as recited in claim 9, wherein the position and orientation measurement device is an optical measurement device.

13. The device as recited in claim 9, wherein the first component is a blade or a part of a blade of a rotor in a gas turbine, and the second component is a ring or a disk of the rotor or is a blade root situated on the periphery of the ring or of the disk.

* * * * *